United States Patent [19]

Raspanti

[11] Patent Number: 5,439,959
[45] Date of Patent: Aug. 8, 1995

[54] COMPOSITIONS FOR THE STABILIZATION OF SYNTHETIC POLYMERS

[75] Inventor: Giuseppe Raspanti, Alzano Lombardo, Italy

[73] Assignee: 3V Inc., Weehawken, N.J.

[21] Appl. No.: 248,008

[22] Filed: May 24, 1994

[51] Int. Cl.⁶ .......................................... C08K 5/3492
[52] U.S. Cl. ...................................... 524/100; 524/102
[58] Field of Search .................................. 524/100, 102

[56] References Cited

U.S. PATENT DOCUMENTS

| | | | |
|---|---|---|---|
| 4,426,472 | 1/1984 | Berner | 524/100 |
| 4,459,395 | 7/1984 | Cantatore | 524/100 |
| 4,692,486 | 9/1987 | Gugumus | 524/100 |
| 5,021,485 | 6/1991 | Gugumus | 524/100 |

Primary Examiner—Kriellion S. Morgan
Attorney, Agent, or Firm—Griffin, Butler, Whisenhunt & Kurtossy

[57] ABSTRACT

A composition for stabilizing synthetic polymers consisting of a derivative of a low molecular weight polymethylpiperidine of formula (I)

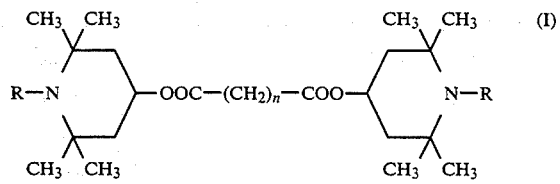

wherein the groups are as defined hereinafter and a derivative of a high molecular weight polymethylpiperidine of formula (II)

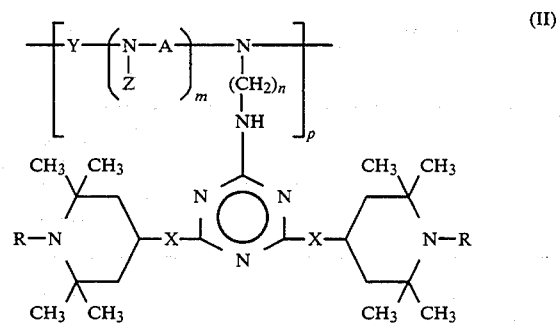

wherein the groups are as defined of hereinafter is disclosed.

These compositions show photostabilizing and antioxidant properties.

17 Claims, No Drawings

COMPOSITIONS FOR THE STABILIZATION OF SYNTHETIC POLYMERS

The present invention relates to compositions consisting of mixtures of derivatives of low molecular weight polymethylpiperidine with derivatives of high molecular weight polymethylpiperidine and to their use as stabilizing agents for synthetic polymers.

BACKGROUND OF THE INVENTION

The use of compounds containing the polymethylpiperidine group, and mainly 2,2,6,6-tetramethyl-1,2,2,6,6-pentamethylpiperidine, for the photostabilization of polymers is well known and to this end a wide literature exists.

Generally this class of stabilizing agents divided into two groups, namely those having low molecular weight (up to 500–600) and those with high molecular weight (higher than 600–700).

A detailed disclosure of some stabilizing agents of this class, the so called hindered amines, of their different kinds and of their applicative characteristic s found Gaechter-Mueller/Taschenbuch der Kunststoff-Additive, 2 Ausgabe 1983 pagg. 144–198.

U.S. Pat. Nos. 4,692,486 and 5,021,485 disclose some synergistic mixtures of derivatives of low and high molecular weight polyalkylpiperidines as photostabilizing agents for polymers. These mixtures contain some low molecular weight stabilizing agents included in the hereinafter described formula (I) together with high molecular weight stabilizing agents.

As disclosed in the above mentioned U.S. patents, these synergistic combinations show at the same concentration a photostabilizing activity remarkable better than the one of their single components.

A problem which is encountered in the polymer field is represented by their low resistance to oxidant agents, for example atmospheric oxygen. It is known in the art the use of sterically hindered phenols to stabilize polymers against oxidation.

The cited prior art gives no teaching about the antioxidant stabilization by the known photostabilizing agents.

It has surprisingly been found that new particular combinations of high and low molecular weight compounds containing the polymethylpiperidine moiety, in addition to synergistic properties as photostabilizing agents, also show synergistic activity in the long term heat stabilization of synthetic polymers. As used herein, the wording "long term heat stabilization" is intended to mean that the polymer is stabilized against the degradation which occurs during the time of use of the polymer itself.

DISCLOSURE OF THE INVENTION

An object of the present invention is a composition for the stabilization of synthetic polymers consisting of a mixture of:
a) a compound of formula (I)

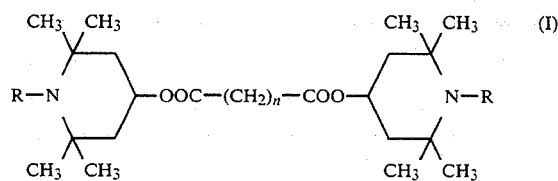

wherein R is hydrogen or methyl, n is a number ranging from 2 to 8, included;
or a mixture of compounds of formula (I);
b) a compound of formula (II)

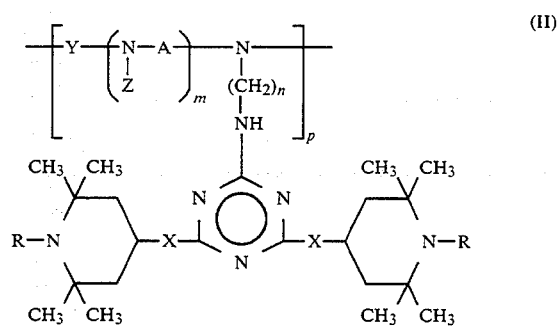

wherein R is hydrogen or methyl, X is oxygen or the N—R$_2$ group in which R$_2$ is hydrogen or a C$_1$-C$_{12}$ straight or branched alkyl, n is a number ranging from 2 to 8, included;
A is —(CH$_2$)$_r$—, in which r can be a number from 2 to 8, the group

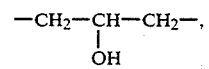

or the group

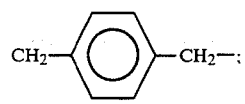

Z is hydrogen, C$_1$-C$_{18}$ alkyl, the group of formula (III)

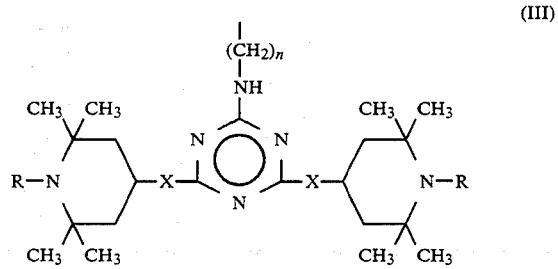

wherein n is a number ranging from 2 to 8, included, X and R are as above defined; or the piperidine of formula (IV)

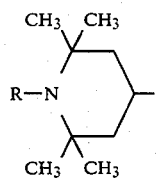 (IV)

in which R has the above defined meaning, m is zero or 1;

Y, when m is zero, has the same meaning of A, when m is 1 can have the same meaning of A or is one of the following groups

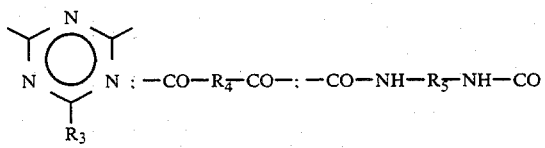

in which $R_3$ is an optionally substituted aryl residue, having from 6 to 14 carbon atoms or the

group in which $R_6$ and $R_7$ can be the same or different and are hydrogen, a $C_1$-$C_{18}$ straight or branched alkyl group, a cycloalkyl group having from 5 to 12 carbon atoms, an aryl group having from 6 to 12 carbon atoms, an aralkyl group having from 7 to 12 carbon atoms, the piperidine group of formula (IV) or, together the nitrogen atom which they are linked to, can form a heterocyclic ring having from 5 to 7 members, optionally containing also oxygen as heteroatom, $R_4$ is phenylene or —$(CH_2)_n$—;

$R_5$ is toluylene, xylylene, —$(CH_2)_n$—, in which n has the above defined meaning;

p can vary from 2 to 100.

Examples of $C_1$-$C_{18}$ straight or branched alkyl group are methyl, ethyl, n-propyl, isopropyl, n-butyl, tert-butyl, pentyl, neo-pentyl, hexyl, heptyl, decyl, dodecyl, hexadecyl, octadecyl.

Examples of optionally substituted aryl group having from 6 to 14 carbon atoms are phenyl, toluyl, o-, m-, p-xylyl.

Examples of cycloalkyl group having from 5 to 12 carbon atoms are cyclopentyl, cyclohexyl, cyclododecyl.

Examples of aralkyl group having from 7 to 12 carbon atoms are benzyl, 4-tert-butylbenzyl.

Examples of heterocyclic group having from 5 to 7 members are: pyrrolidine, piperidine, hexamethyleneimine, morpholine.

The compounds of formula (I) and (II) are known; their methods of preparation as well as their uses as stabilizing agents are described in patents GB 1,390,251, U.S. Pat. Nos. 3,640,928 and 4,477,615.

The stabilizing compositions according to the present invention show a photoprotective activity higher than the single components of formula (I) or (II).

In the compositions according to the present invention the ratios between the low molecular weight compounds of formula (I) and high molecular weight compounds of formula (II) range from 90:10 to 10:90 and preferably from 70:30 to 30:70.

The above ratios can be both of single compounds of formula (I) with single compounds of formula (II), and of mixtures of compounds of formula (I) with mixtures of compounds of formula (II).

In a first preferred embodiment, the present invention provides a composition which consists of at least a compound of formula (I) as above defined and at least a compound of formula (II) wherein Y is as above defined, A is —$(CH_2)_r$—, r is 2 or 3, Z is as above defined, m is 1, n is 2 or 3, X is the N—$R_2$ group, wherein $R_2$ is n-butyl, R is as above defined, p is as above defined.

In a second preferred embodiment, the present invention provides a composition which consists of at least a compound of formula (I) as above defined and at least a compound of formula (II), wherein Y is the group of formula

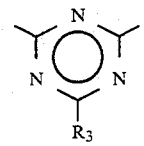

wherein $R_3$ is the group $NR_6R_7$, $R_6$ is n-butyl and $R_7$ is the above piperidine group of formula (IV), m is 1, Z is hydrogen, A the group —$(CH_2)_r$—, wherein r is 2 or 3, n is 2 or 3, X is N—$R_2$, wherein $R_2$ is as above defined and p is as above defined.

In a third preferred embodiment, the present invention provides a composition which consists of at least a compound of formula (I) and at least a compound of formula (II) wherein m is 1, Y is the group of formula

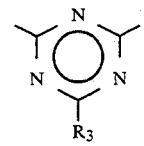

wherein $R_3$ is $NR_6R_7$, wherein $R_6$ and $R_7$ are as above defined, Z is the group of formula (III) as above defined, wherein n is 2 or 3, X is N—$R_2$, wherein $R_2$ is n-butyl, R is as above defined, A is —$CH_2$—$CH_2$—, n is 2 or 3 and p is as above defined.

The stabilizing compositions of the present invention are prepared by simply admixing the compound(s) of formula (I) with the compound(s) of formula (II) in powdery form to thoroughness in a suitable mixer in the desired ratios. Alternatively, the compounds (I) and (II) are suspended in a proper medium and after stirring for an adequate length of time, the suspending medium is evaporated off, or the mixture is recovered by filtration and subsequently dried. In a further mode, the compounds (I) and (II) are dissolved in a solvent and after thorough stirring, the solvent is evaporated off, thus obtaining the composition in the form of a powder.

The compounds of formula (I) and (II) can be used by adding them to the material to be stabilized, both in their mixture and singly.

The concentration of the stabilizing compositions according to the present invention in the polymers can generally vary from 0,01 to 5% and preferably from 0,05 to 2%.

The stabilizing mixture can be added to the polymers also in the form of 5–25% by masterbatches.

The incorporation can be carried out according to various methods, for example by dry mixing the polymer with the stabilizing mixture or said mixture can be added to a suspension of the polymer to be stabilized in a suitable solvent and subsequently evaporating off the solvent.

Subsequently the polymers containing the stabilizing mixture are extruded or treated according to methods usually known in the art.

According to the present invention the compositions of compounds of formula (I) and (II) are used for the stabilization of synthetic polymers, particularly of polyolefins such as for example low and high density polyethylene, polypropylene, polymethylpentene, polyisoprene, polystyrene, polymethylstyrene and copolymers thereof and/or with other vinyl monomers as for example acrylonitrile, vinyl acetate, acryl esters.

The stabilizing compositions according to the present invention can be used also together with other additives commonly used in the technology of the synthetic polymers, such as for example: antioxidants, for example those belonging to the classes of phenols, thioethers, phosphites and phosphonites; UV-absorber, for example oxanilydes, benzotriazole and benzophenone derivatives; nickel complexes; metal deactivators, for example oxalic acid amides, plasticizers, antistatic agents, pigments, optical bleaching agents, flame retarders.

The following examples further disclose the present invention.

Example 1

A set of stabilized polymers was prepared as described hereinafter. The stabilizing agents are listed in the following Table 1.

According to the invention, the stabilizing composition consists of a mixture, in this case in a 50:50 w/w ratio, of the agents ST-1+ST-3 and ST-2+ST-4, having the formulae shown in Table 1.

For comparison purpose, polymers stabilized with single stabilizing agents of formula (I) or (II) or with compositions consisting of mixtures of a low molecular weight stabilizing agent of formula (I) and a high molecular weight stabilizing agent, according to the above cited patents U.S. Pat. No. 5,021,485 (ST1+ST-6) and U.S. Pat. No. 4,692,486 (ST-2+ST-7), as shown in Table 1, were prepared.

The stabilizing compositions were prepared by directly admixing the compounds in the form of a powder.

TABLE 1

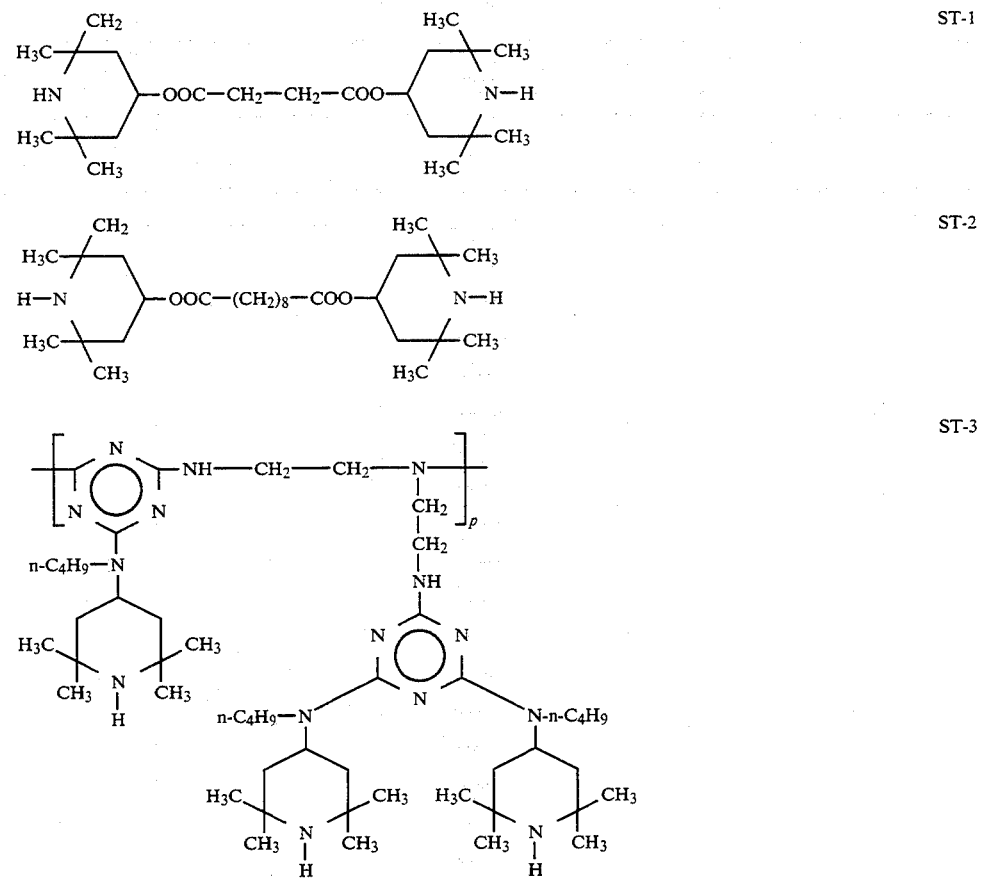

TABLE 1 -continued

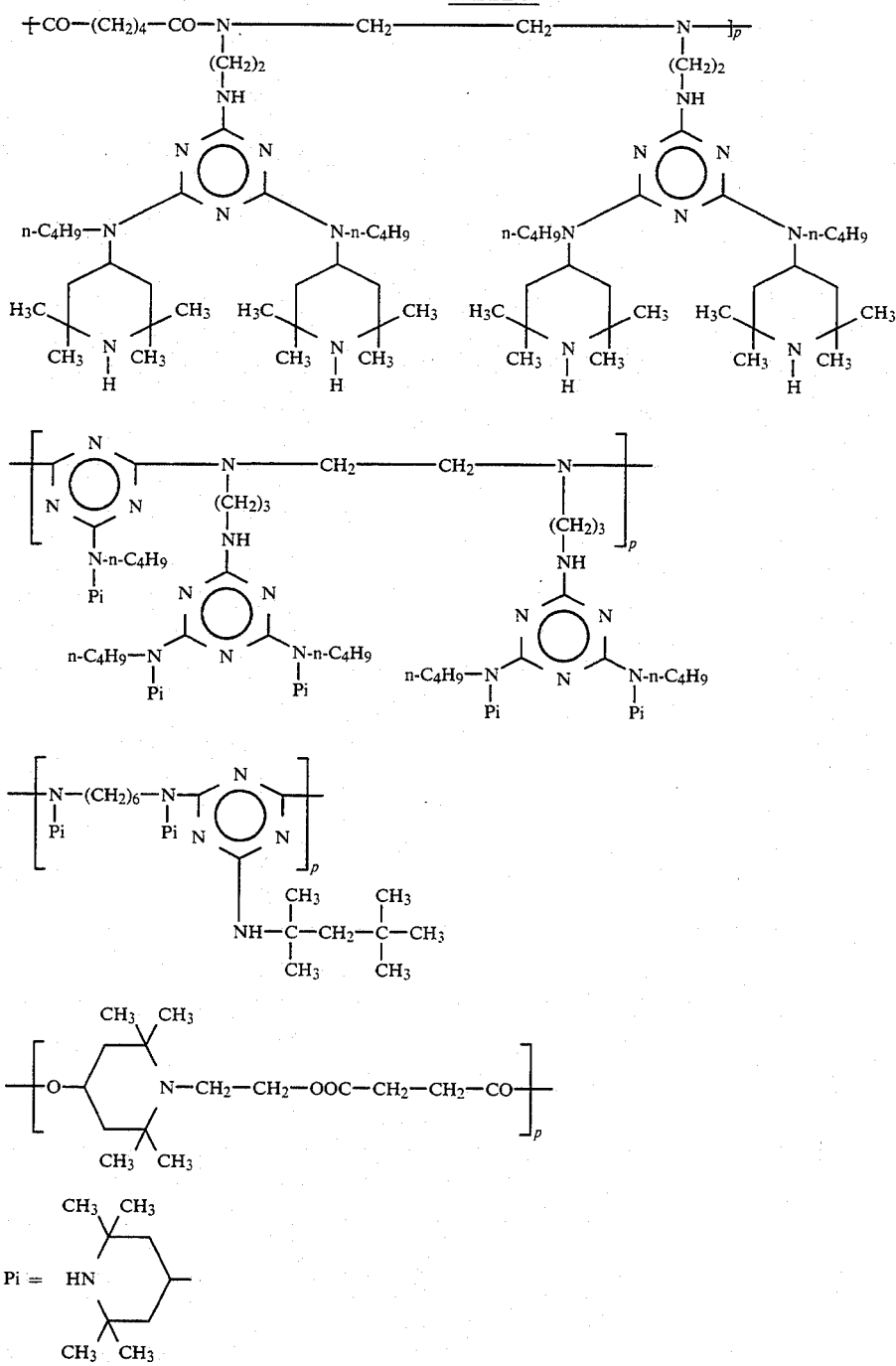

1,000 g of low density polyethylene (Riblene EF 2100 V-Enichem ®), 2 g of n-octadecyl-3-(3,5-di-tert-butyl-4-hydroxyphenyl)propionate, 1 g of calcium stearate and 1 g of a stabilizing agent of Table 1 or of a mixture thereof in 50:50 w/w ratio, were mixed homogeneously. The mixtures were extruded at 190° C. and transformed into pellets. From these pellets, by means of pressure forming at 200° C., films of 0.2 mm thickness were obtained.

Samples of these films were subjected to UV radiation in a Weatherometer WOM Ci-65 ® at a black panel temperature of 63° C. In the irradiated samples the increase of the carbonyl band at 5.85 nm in the infrared was measured and the T-0.1, i.e. the time necessary to give an increase of 0.1 of the carbonyl band, was determined. The results are reported in the following Table 2.

TABLE 2

| Stabilizing agent | T 0.1 (hours) |
|---|---|
| Without stabilizing agent | 300 |
| ST-1 | 1,900 |
| ST-2 | 2,300 |
| ST-3 | 2,050 |
| ST-4 | 2,100 |
| ST-5 | 2,050 |

TABLE 2-continued

| Stabilizing agent | T 0.1 (hours) |
| --- | --- |
| ST-6 | 2,100 |
| ST-7 | 1,750 |
| ST-1 + ST-3 (according to the present invention) | 2,750 |
| ST-2 + ST-4 (according to the present invention) | 2,900 |
| ST-1 + ST-6 (according to U.S. Pat. No. 5,021,485) | 2,850 |
| ST-2 + ST-7 (according to U.S. Pat. No. 4,692,486) | 2,600 |

Example 2

Homogeneous mixtures, consisting of 1,000 g of polypropylene, (Moplen FLF 20-Himont®), 1 g of 1,3,5-tris-(3,5-di-tert-butyl-4-hydroxybenzyl)isocyanurate, 0.5 g of calcium stearate and 2 g of a stabilizing agent of Table 1 or of a 50:50 mixture thereof were prepared. The mixtures were extruded at 250° C. and granulated. From these, by means of pressure forming at 260° C., 1 mm thickness-test pieces were obtained.

The so obtained test pieces were subjected to atmospheric oxygen action by heating at 130° C. in a forced air circulation oven.

The degradation was evaluated by determining the time necessary for the "chalky" appearance on test pieces.

The results are reported in the following Table 3.

TABLE 3

| Stabilizing agent | T (days) |
| --- | --- |
| Without stabilizing agent | 35 |
| ST-1 | 41 |
| ST-2 | 48 |
| ST-3 | 54 |
| ST-5 | 61 |
| ST-6 | 58 |
| ST-7 | 49 |
| ST-2 + ST-3 (according to the present invention) | 81 |
| ST-1 + ST-5 (according to the present invention) | 85 |
| ST-1 + ST-6 (according to U.S. Pat. No. 5,021,485) | 64 |
| ST-2 + ST-7 (according to U.S. Pat. No. 4,692,486) | 59 |

As it can be seen from the above results, the stabilizing agent compositions according to the present invention, although having the same efficacy of the compositions of U.S. Pat. Nos. 5,021,485 and 4,692,486 as far as stabilization against UV radiations is concerned, they show a surprisingly higher effect in the antioxidant stabilization.

Example 3

In an Erweka AR-400 powder mixer 1,600 g of polypropylene (Moplen FLF 20-Himont®), 200 g of stabilizing agent ST-2 and 200 g of stabilizing agent ST-5 (see Table 1) were homogeneously admixed.

The so obtained mixture was immediately extruded with a double screw extruder at 180° C. and granulated. 2 kg of a masterbatch containing 20% of a stabilizing mixture according to the present invention were obtained.

I claim:

1. A composition for the stabilization of synthetic polymers consisting of:

a) a compound of formula (I)

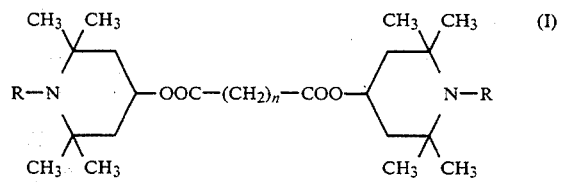

wherein:

R is hydrogen or methyl, n is a number ranging from 2 to 8, included;

or a mixture of compounds of formula (I);

b) a compound of formula (II)

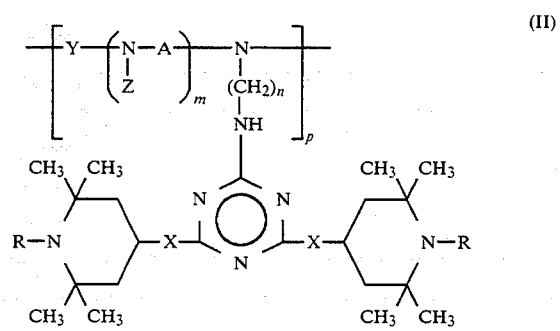

wherein R is hydrogen or methyl, X is oxygen or the group N—$R_2$ in which $R_2$ is hydrogen or $C_1$-$C_{12}$ straight or branched alkyl group, n is a number ranging from 2 to 8, included A is —$(CH_2)_r$—, in which r can be a number from 2 to 8, the group

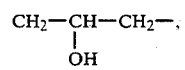

or the group

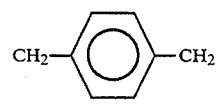

Z is hydrogen, $C_1$-$C_{18}$ alkyl, the group of formula (III)

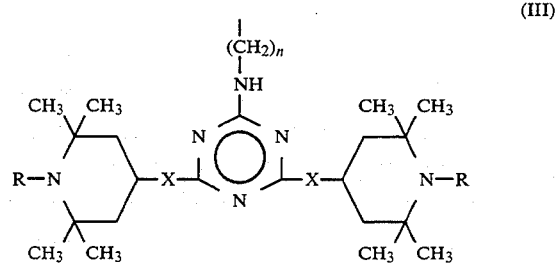

wherein n is a number ranging from 2 to 8, included, X and R are as above defined;

or the piperidine group of formula (IV)

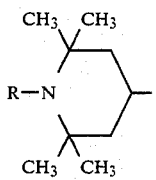
(IV)

in which R has the meaning above defined, m is zero or 1;

Y, when m is zero, has the same meaning of A, when m is 1 can have the same meaning of A or is one of the following groups

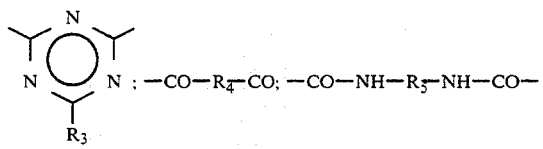 ; —CO—R₄—CO; —CO—NH—R₅—NH—CO— in which R₃ is an optionally substituted aryl residue, having from 6 to 14 carbon atoms or the group

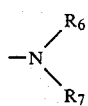

in which R₆ and R₇ can be the same or different and are hydrogen, a $C_1$-$C_{18}$ straight or branched alkyl group, a cycloalkyl group having from 5 to 12 carbon atoms, an aryl group having from 6 to 12 carbon atoms, an aralkyl group having from 7 to 12 carbon atoms; the piperidine group of formula (IV) or, together the nitrogen atom, can form a 5 to 7 member heterocyclic ring, optionally containing oxygen as heteroatom, R₄ is phenylene or —(CH₂)ₙ—, R₅ is toluylene, xylylene, —(CH₂)ₙ—, in which n has the above defined meaning, p can range from 2 to 100;

or a mixture of compounds of formula (II).

2. A composition according to claim 1, wherein the weight by weight ratio between the compound or the mixture of the compounds of formula (I) and the compound or the mixture of the compounds of formula (II) ranges from 90:10 to 10:90.

3. A composition according to claim 1, wherein b) is a compound of formula (II)

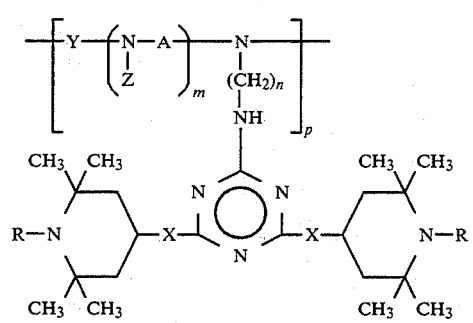
(II)

wherein Y is as above defined, A is —(CH₂)ᵣ—, where r is 2 or 3, Z is as above defined, m is 1, n is 2 or 3, X is the group N—R₂, wherein R₂ is n-butyl, R is as above defined, p is as above defined or a mixture of said compounds.

4. A composition according to claim 1, wherein b) is a compound of formula (II)

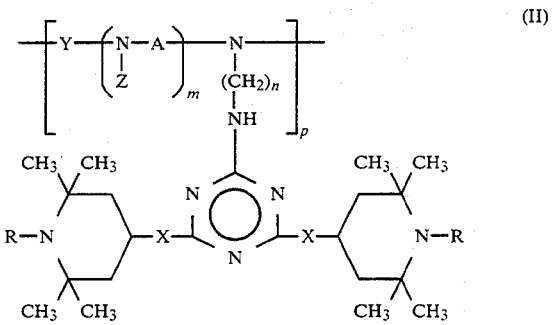
(II)

wherein Y is the group of formula

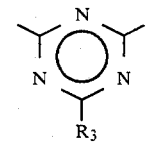

wherein R₃ is the group NR₆R₇, where R₆ is n-butyl and R₇ is the piperidine group of formula (IV) as above defined, m is 1, Z is hydrogen, A the group —(CH₂)ᵣ—, wherein r is 2 or 3, n is 2 or 3, X is N—R₂, wherein R₂ is as above defined and p is as above defined or a mixture of said compounds.

5. A composition according to claim 1, wherein b) is a compound of formula (II)

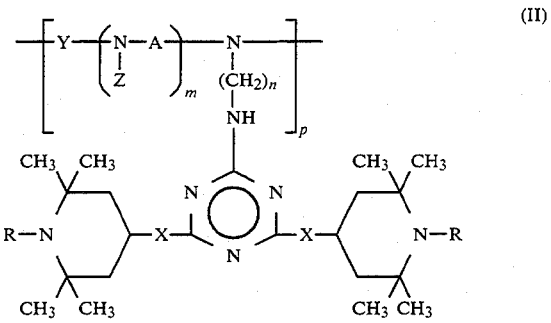
(II)

wherein m is 1, Y is the group of formula

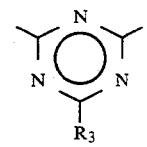

wherein R₃ is —NR₆R₇, wherein R₆ and R₇ are as above defined, Z is the group of formula (III) as above defined, wherein n is 2 or 3, X is N—R₂, wherein R₂ is n-butyl, R is as above defined, A is —CH₂—CH₂—, n is 2 or 3 and p is as above defined or a mixture of said compounds.

6. A composition according to claim 1, wherein the ratio between the compound or the mixture of compounds of formula (I) and the compound or the mixture of compounds of formula (II) is 50:50 w/w.

7. A composition according to claim 1, consisting of from 70:30 to 30:70 w/w ratio of a) a compound of formula

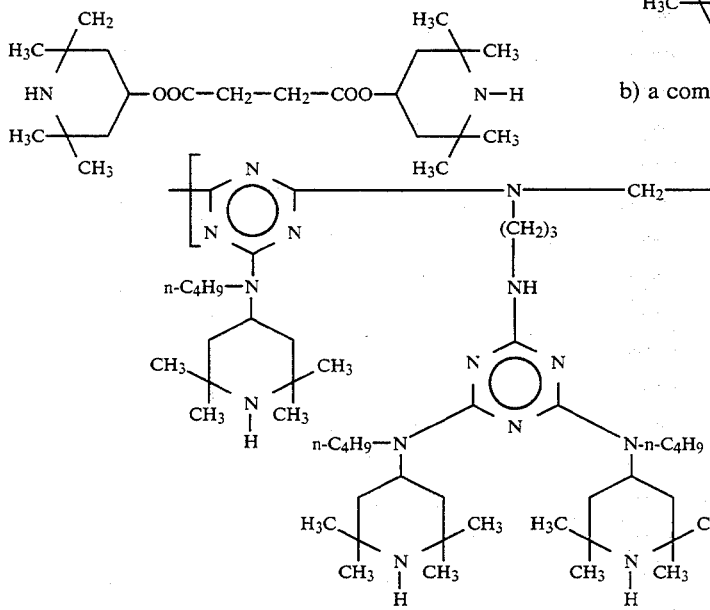

b) a compound of formula

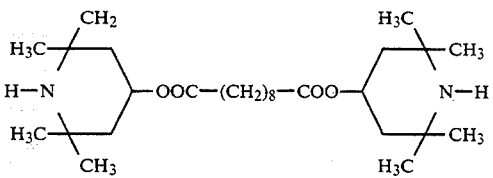

b) a compound of formula

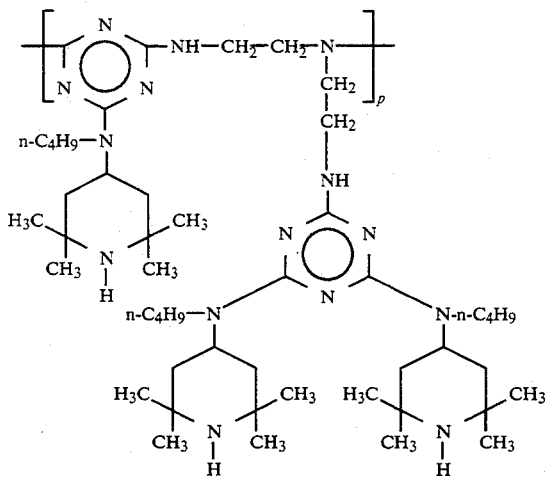

8. A composition according to claim 1, consisting of from 70:30 to 30:70 w/w ratio of a) a compound of formula

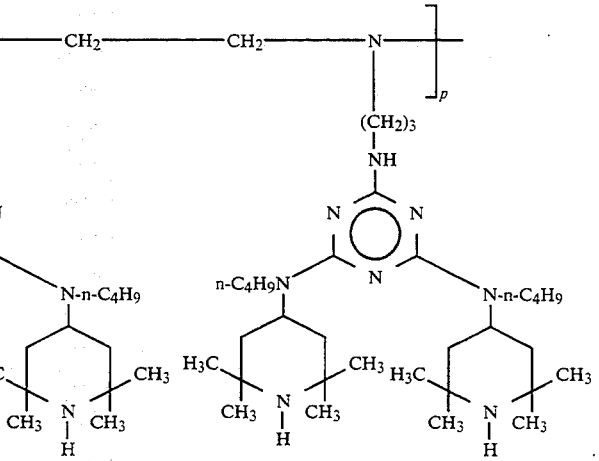

b) a compound of formula

9. Masterbatch for the stabilization of synthetic polymers containing from 5 to 25% by weight of a composition of claim 1.

10. A method for stabilizing synthetic polymers, characterized in that a composition of claim 1 is added to said polymers in an amount between 0,01 and 5% by weight.

11. A method according to claim 10, characterized in that said composition is admixed with the dry polymer.

12. A method according to claim 10, characterized in that said composition is added to a suspension of the polymer in a suitable solvent and said solvent is subsequently evaporated off.

13. A method according to claim 10, characterized in that one or more conventional additives are added to the polymer.

14. A method according to claim 10, characterized in that the polymers are polyolefins.

15. A method according to claim 14, characterized in that the polymers are selected from the group consisting of low and high density polyethylene, polypropylene, polymethylpentene, polyisoprene, polystyrene, polymethylstyrene and copolymers thereof and/or with other vinyl monomers.

16. A method for the stabilization of polymers characterized in that a masterbatch of claim 9 is added to said polymers in an amount as to give concentration of composition between 0,01 and 5% w/w.

17. A method for the stabilization of synthetic polymers, characterized in that at least a compound of formula (I) and at least a compound of formula (II) as defined in claim 1 are added to said polymers.

* * * * *